(12) United States Patent
Cannata (10) Patent No.: US 9,928,198 B2
(45) Date of Patent: Mar. 27, 2018

(54) ADAPTER CARD WITH A COMPUTER MODULE FORM FACTOR

(71) Applicant: Oracle International Corporation, Redwood Shores, CA (US)

(72) Inventor: Frank J. Cannata, Littleton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 371 days.

(21) Appl. No.: 14/087,718

(22) Filed: Nov. 22, 2013

(65) Prior Publication Data

US 2015/0149686 A1 May 28, 2015

(51) Int. Cl.
*G06F 13/00* (2006.01)
*G06F 13/40* (2006.01)

(52) U.S. Cl.
CPC .............................. *G06F 13/4022* (2013.01)

(58) Field of Classification Search
CPC .................................................. H04N 1/00204
See application file for complete search history.

(56) References Cited

U.S. PATENT DOCUMENTS

| 5,898,870 | A  | * | 4/1999 | Okuda .................... G06F 9/505 718/104 |
| 8,271,715 | B2 |   | 9/2012 | Yap et al. |
| 8,447,888 | B2 |   | 5/2013 | Ajanovic et al. |
| 2004/0111753 | A1 | * | 6/2004 | Hoang ................ H04L 12/2801 725/111 |
| 2006/0126612 | A1 |   | 6/2006 | Sandy et al. |
| 2007/0026697 | A1 | * | 2/2007 | Hsu .......................... G06F 1/20 439/61 |
| 2008/0287199 | A1 | * | 11/2008 | Macika ............... G07F 17/3216 463/43 |
| 2009/0234983 | A1 | * | 9/2009 | Golden .................... G06F 3/14 710/30 |
| 2013/0115819 | A1 |   | 5/2013 | Liu et al. |
| 2014/0156897 | A1 | * | 6/2014 | Reinke ............... G06F 13/4068 710/301 |

FOREIGN PATENT DOCUMENTS

| EP | 1947921 A1 | 7/2008 |
| WO | 2007099330 A1 | 9/2007 |

OTHER PUBLICATIONS

Avago Technologies; White Paper; "A Demonstration of PCI Express Generation 3 Over a Fiber Optical Link"; AV02-3245EN—Jul. 3, 2012.
Oracle Communications; Oracle Data Sheet; "ACME Packet 6300". www.onestopsystems.com/direct_attached_products.php; accessed Sep. 30, 2013.

* cited by examiner

*Primary Examiner* — Hyun Nam
*Assistant Examiner* — Juanito Borromeo
(74) *Attorney, Agent, or Firm* — Potomac Law Group, PLLC (57) ABSTRACT

A system includes a circuit board with a Peripheral Component Interconnect Express ("PCIe") backplane. The backplane is configured to receive processing power from a computer module. An adapter card having a computer module form factor is coupled to the PCIe backplane instead of the computer module. The adapter card includes a switch that aggregates one or more PCIe lanes and a transceiver. A communication link couples the transceiver to a remote processor device, which provides processing power to the circuit board.

20 Claims, 7 Drawing Sheets

ADAPTER CARD WITH A COMPUTER MODULE FORM FACTOR

FIELD

One embodiment is directed generally to a computer module, and in particular to an adapter card with a computer module form factor.

BACKGROUND INFORMATION

A "computer module" is a selection of independent electronic circuits packaged onto a circuit board to provide a basic function within a computer. Also referred to as a "computer-on-module" ("COM"), today's computer modules are complete embedded computers built on a single circuit board. The design is centered on a microprocessor with random-access memory ("RAM"), input/output controllers and all other features needed to be a functional computer on the single board.

One type of industry standard based COM is "COM Express", which defines a COM form factor and is a highly integrated and compact personal computer ("PC") that can be used in a design application much like an integrated circuit component. Each COM Express module integrates a core central processing unit ("CPU") and memory functionality, the common input/output ("I/O") of a PC/AT, Universal Serial Bus ("USB"), audio, graphics, and Ethernet. All I/O signals are mapped to two high density, low profile connectors on the bottom side of the module. The COM Express specification is available from www.picmg.org.

SUMMARY

One embodiment is a system that includes a circuit board with a Peripheral Component Interconnect Express ("PCIe") backplane. The backplane is configured to receive processing power from a computer module. An adapter card having a computer module form factor is coupled to the PCIe backplane instead of the computer module. The adapter card includes a switch that aggregates one or more PCIe lanes and a transceiver. A communication link couples the transceiver to a remote processor device, which provides processing power to the circuit board.

DETAILED DESCRIPTION

One embodiment is an adapter card that has a computer module form factor and replaces a computer module on a circuit board. The adapter card connects to an external server or other processing/processor device that provides processing power to the circuit board instead of the replaced computer module. In one embodiment, the computer module that is replaced is a COM Express module and the adapter card is connected to a Peripheral Component Interconnect Express ("PCI Express" or "PCIe") backplane on the circuit board.

As described above, a computer module includes its own processor/CPU. However, the CPU may be relatively underpowered compared to a user's needs. For example, the CPUs used in accordance with the COM Express standards are generally low power mobile versions of processors from Intel Corp., such as those used in laptops. If a user desires more performance, the user must wait for the COM Express manufacturers to develop a new card with a more advanced/powerful processor. However, the mobile processors that have typically been included with COM Express modules usually have less computing power, fewer number of cores and less cache as compared to those processors typically used in computer servers.

Figure 1:
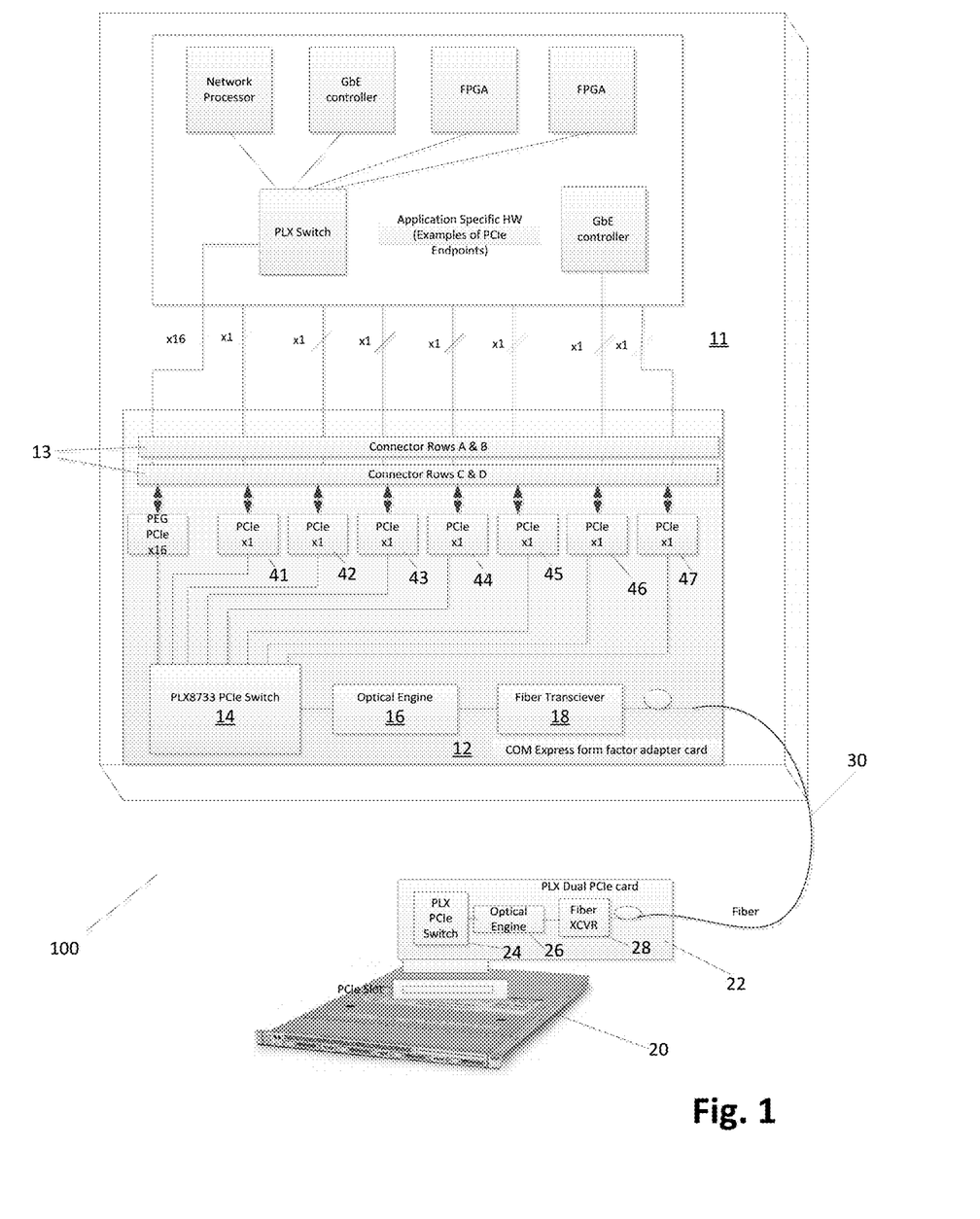
FIG. 1 is a block diagram of a system with an adapter card in accordance with one embodiment of the present invention.

FIG. 1 is a block diagram of a system 100 with an adapter card 12 in accordance with one embodiment of the present invention. System 100 includes a PCIe based circuit/main board with several PCIe lanes 41-47 that connect to a low profile connector 13 or other connection mechanism. Backplane 11 is configured to include a COM Express module coupled to connector 13 to provide processing power to backplane 11 and to allow the COM Express module to interface with PCIe lanes 41-47. In one embodiment, backplane 11 is the main board from the "Acme Packet 6300" Session Border Controller from Oracle Corp.

Instead of the COM Express module typically installed using connector 13 to provide processing power, embodiments replace the COM Express module with adapter card 12 that has a COM Express form factor. Adapter card 12 includes a PCI Express switch 14, an optical engine 16, and a fiber optics transceiver 18 in one embodiment. Switch 14 aggregates all or some of PCIe lanes 41-47. Some or all of the PCIe lanes (e.g., four PCIe lanes in the example of FIG. 1) are coupled to optical engine 16 and fiber optics transceiver 18 that convert the PCIe electrical signals to a parallel fiber optical link 30 that functions as a communication link. In one embodiment, optical engine 16 and fiber optics transceiver 18 are implemented using the "MiniPOD" Optical Transmitter and Receiver from Avago Technologies. In one embodiment, fiber optical link 30 is a Multiple-Fiber Push-On/Pull-off ("MPO") connector, which can include 12, 24 or 48 individual optical fibers that can handle up to 10 Gbps each.

Fiber optical link 30 couples backplane 11 to an external processor device 20 via a PCIe form factor adapter card 22 that plugs into a PCIe backplane on device 20. In other embodiments, other form factors besides PCIe can be used for card 22. Adapter card 22, similar to adapter card 12, includes a PCI Express switch 24, an optical engine 26, and a fiber optics transceiver 28 that can be implemented similar to as on adapter card 12.

External processor device 20 can be any processor device that meets the required processing needs for circuit board 11. In one embodiment, processor device 20 is a "multi-Xeon" server board that includes "Xeon" processors from Intel Corp. In one embodiment, processor device 20 is a Xeon server blade from a "Netra" server from Oracle Corp. External processor device 20 can be separated from board 11 though fiber link 30 by 100 meters or more. In one embodiment, processor device 20 executes the "Linux" operating system and is able to detect and communicate with all of the PCIe endpoints/lanes from board 12 in a known manner.

Figure 2A:
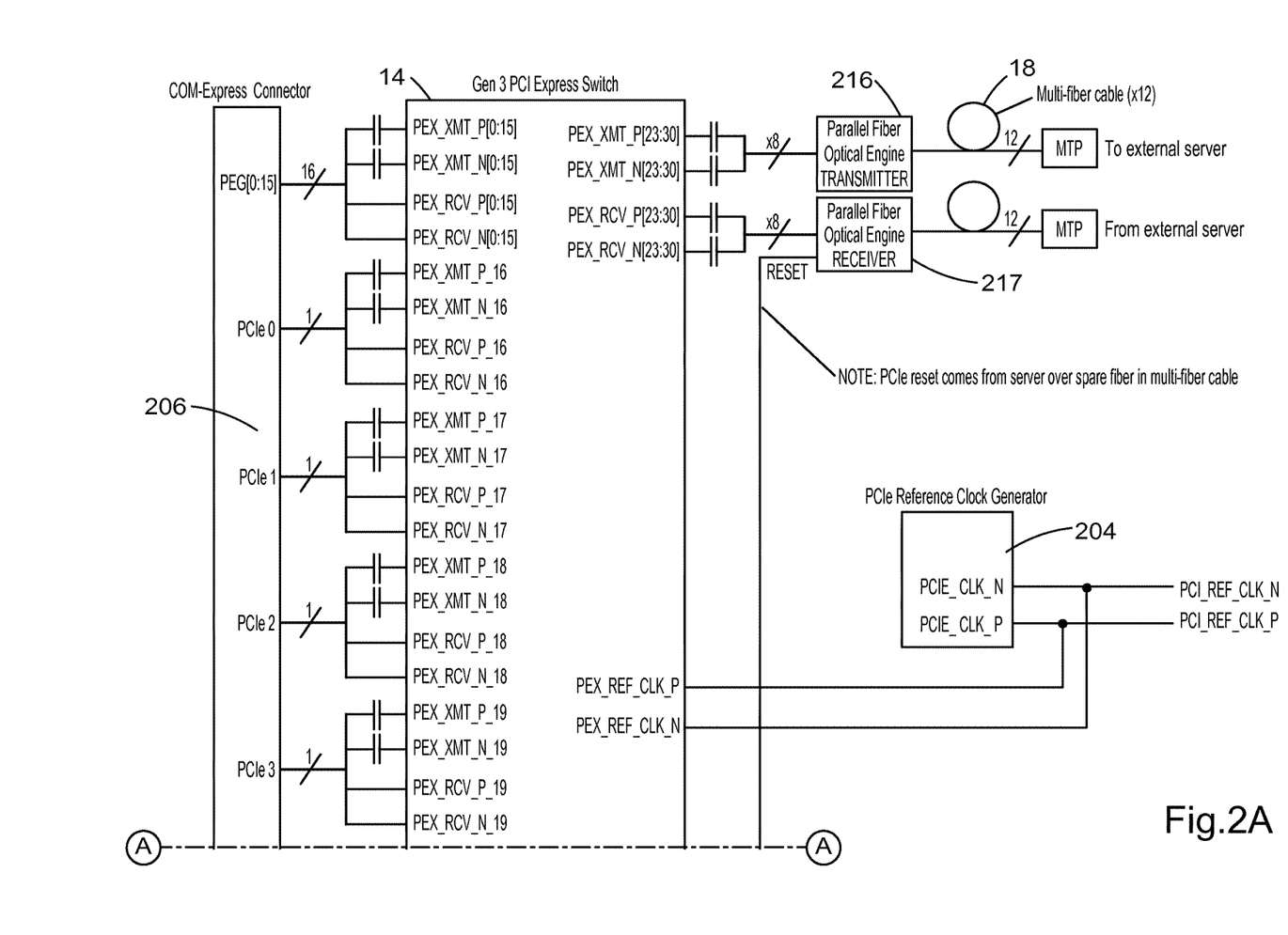
FIGS. 2A and 2B are a block diagram of the adapter card in accordance with one embodiment.
Figure 2B:
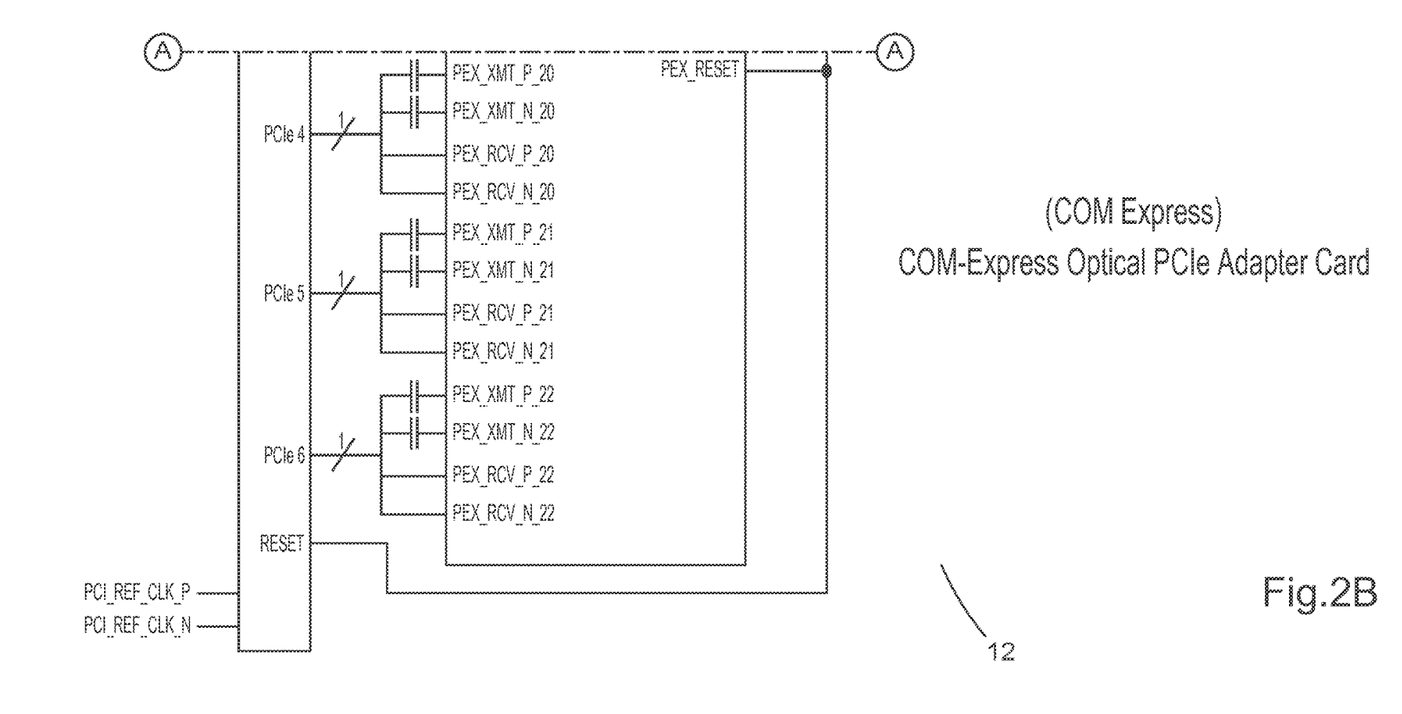

FIG. 2 is a block diagram of adapter card 12 in accordance with one embodiment. Card 12 includes a COM Express connector 206. The embodiment shown in FIG. 2 utilizes parallel optics 216, 217 for transmit/receive. One embodiment implements the "MiniPOD" Optical Transmitter and Receiver from Avago. The MiniPOD has 12 optical transmitters capable of 10 Gb/s per fiber up to 100 meters, which is more than adequate for the 8 Gb/s rate of "PCIe 3.0" (slower rates for "PCIe 1.0" and "PCIe 2.0" can also be supported). A separate MiniPOD device is used for transmit (216) and for receive (217). Since one embodiment only requires 8 PCIe lanes, there will be 4 unused fiber strands in the multi-fiber cable. One of these can be used as a reset line from the server or other processor device 20. A PCIe reference clock 204 allows PCIe switch 14 to recover clock from the PCIe from server/processor device 20.

Figure 3:
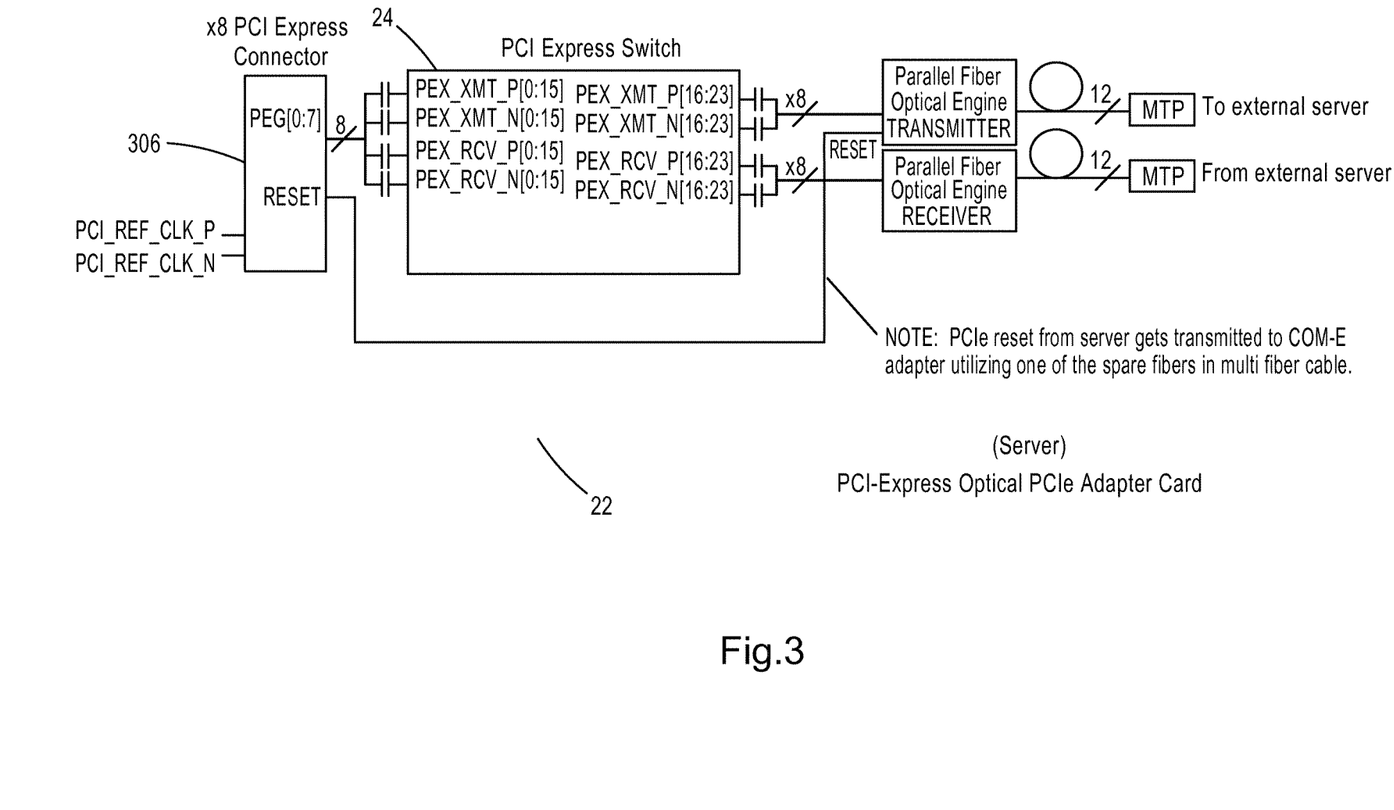
FIG. 3 is a block diagram of a PCIe form factor adapter card that resides in a processor device in accordance with one embodiment and that communicates with the adapter card of FIG. 2.

FIG. 3 is a block diagram of PCIe form factor adapter card 22 that resides in processor device 20 in accordance with one embodiment and that communicates with adapter card 12 of FIG. 2. Adapter card 22 includes a PCIe connector 306.

Figure 4A:
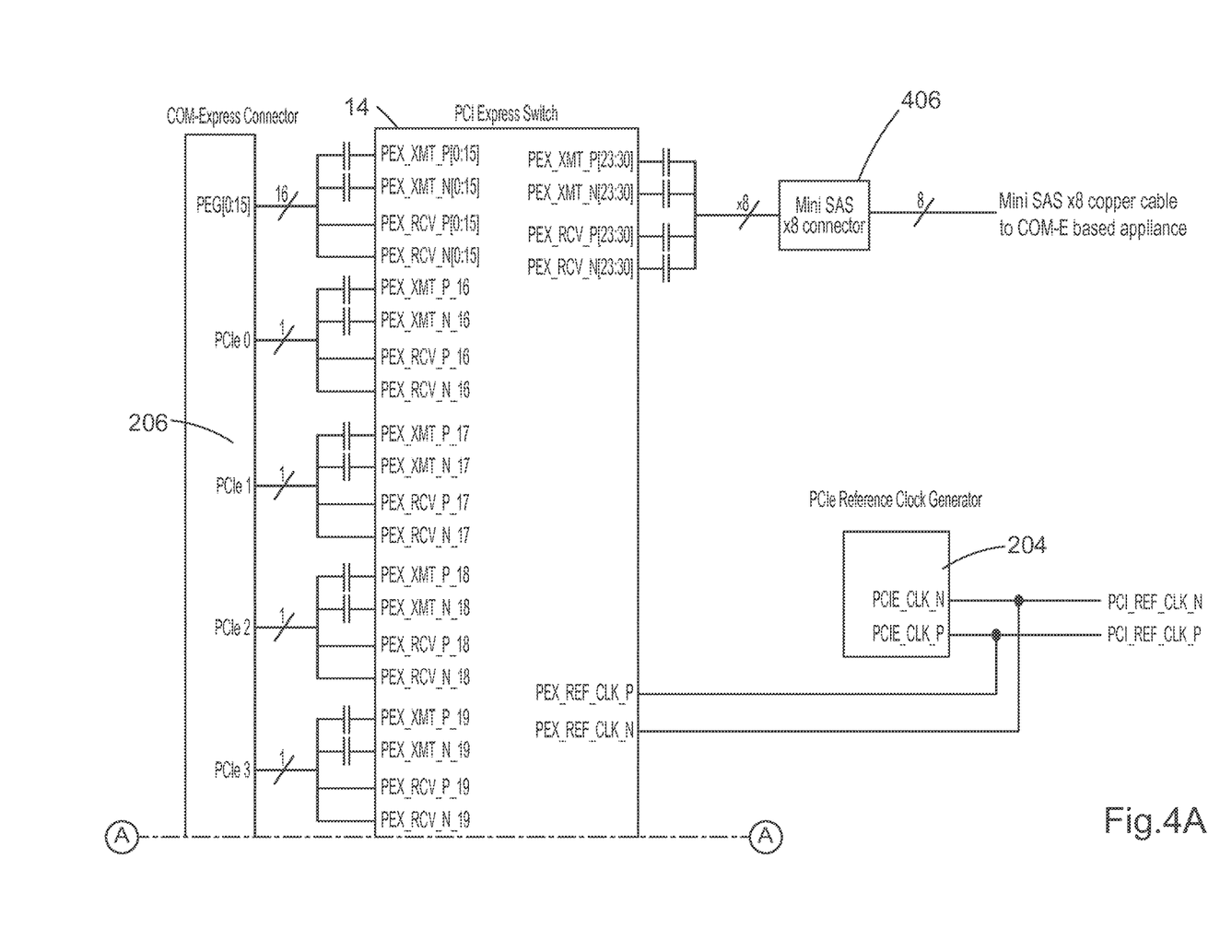
FIGS. 4A and 4B are a block diagram of an adapter card in accordance with another embodiment of the present invention.
Figure 4B:
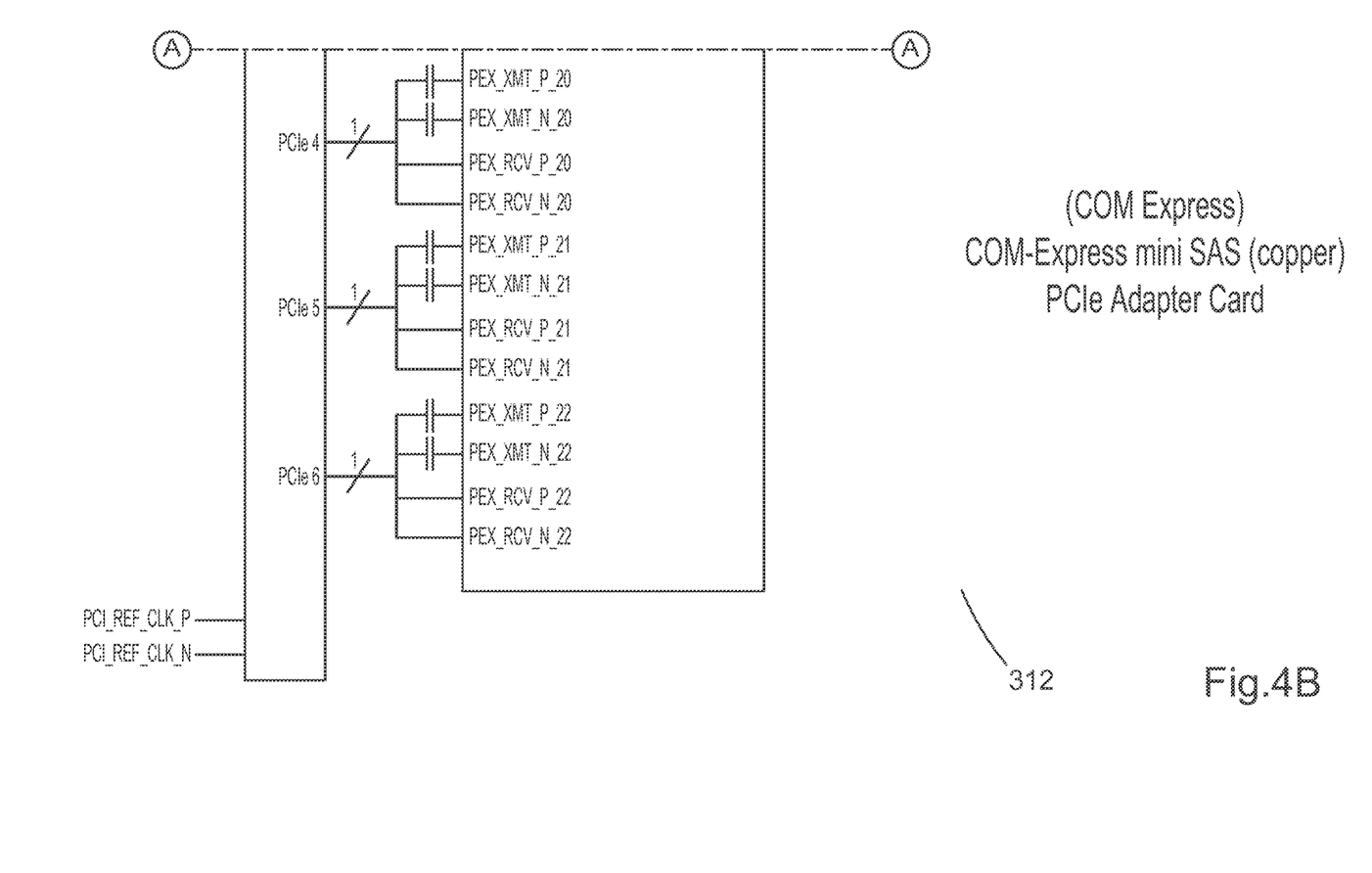

FIG. 4 is a block diagram of an adapter card 312 in accordance to another embodiment of the present invention. Adapter card 312 uses copper wire or other physical means as a communication/transmission link instead of optical fiber as with the embodiments shown in FIGS. 1-3. One embodiment of card 312 includes a mini Serial Attached Small Computer System Interface ("SAS") connector/cable 406. The mini SAS specification supports up to 12.5 Gb/s of bandwidth, which is used as a physical layer for PCIe. The mini SAS specification supports up to 12.5 Gb/s of bandwidth per lane, which is more than adequate for PCIe 3.0. Embodiments of FIG. 4 do not include a reset link as with the optical fiber embodiments since all of the conductors would be used for PCIe.

Figure 5:
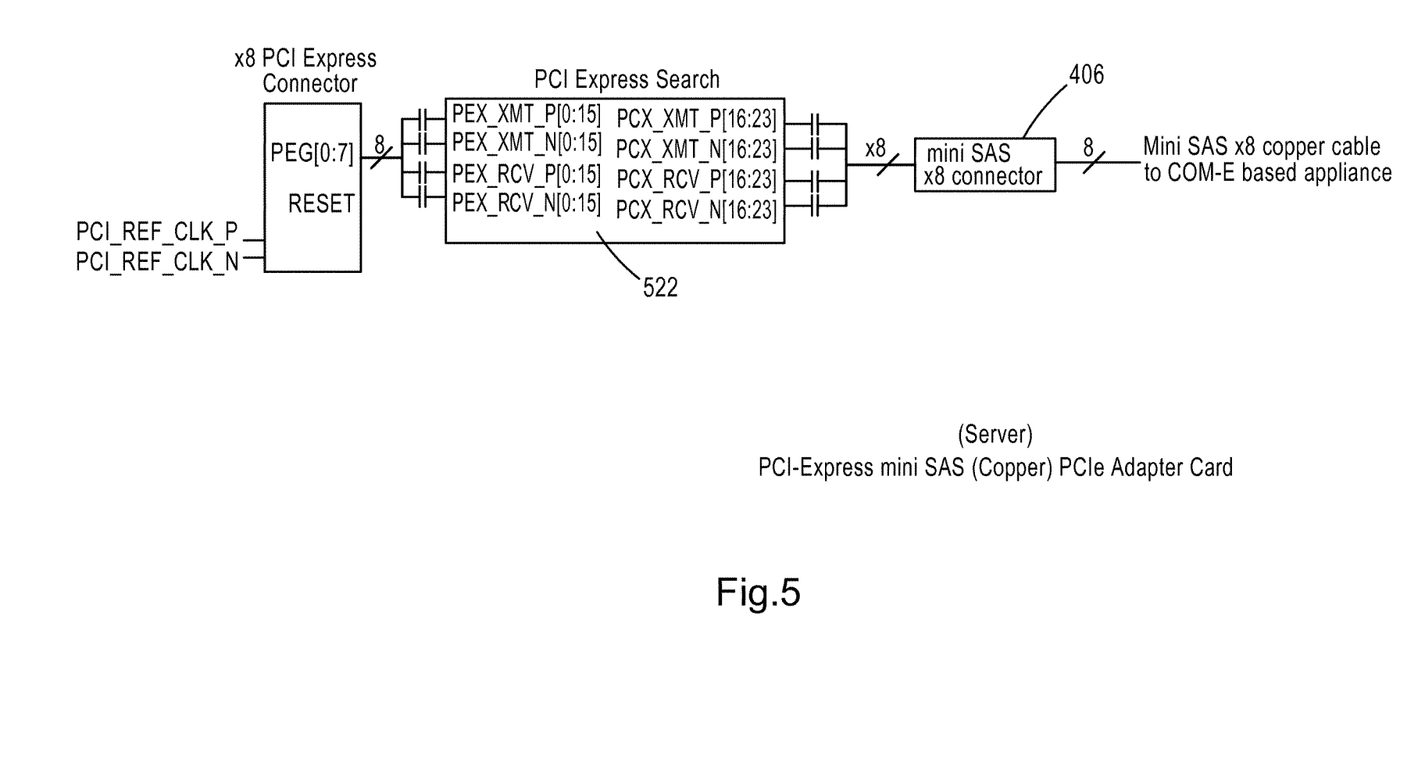
FIG. 5 is a block diagram of a PCIe form factor adapter card that resides in a processor device in accordance with one embodiment and that communicates with the adapter card of FIG. 4.

FIG. 5 is a block diagram of a PCIe form factor adapter card 522 that resides in processor device 20 in accordance with one embodiment and that communicates with adapter card 312 of FIG. 4. Adapter card 522 includes a mini SAS connector 406.

As disclosed, embodiments replace a computer module that provides processing power to a circuit board with an adapter card having a computer module form factor and a link to a remote processor device. The remote processor device provides increased processing power to the circuit board.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A system comprising:
   a circuit board of a computing device comprising a first Peripheral Component Interconnect Express (PCIe) backplane configured to receive a core central processing unit (CPU) of the computing device from a computer-on-module (COM) express module adapter card that is coupled to the backplane;
   a replacement adapter card having a (COM) express form factor and coupled to the first PCIe backplane instead of the (COM) express module adapter card, the replacement adapter card comprising a switch that aggregates one or more PCIe lanes and a transceiver; and
   a communication link coupling the transceiver to a remote processor device, the remote processor device providing the core CPU to the computing device;
   wherein the remote processor device comprises a second adapter card that plugs into a second backplane on an external processor device, wherein the external processor device comprises an external CPU that functions as the core CPU of the computing device;
   wherein the second backplane is physically separated from the first PCIe backplane and the first PCIe backplane receives the core CPU of the computing device from the remote processor device.

2. The system of claim 1, wherein the communication link is an optical fiber.

3. The system of claim 1, wherein the communication link is a copper cable.

4. The system of claim 1, wherein the remote processor device comprises a server having a plurality of processors.

5. The system of claim 1, wherein the replacement adapter card further provides to the computing device: memory functionality, input/output, a Universal Serial Bus (USB), audio and graphics.

6. The system of claim 1, wherein the communication link comprises a plurality of optical fibers, and one of the optical fibers comprises a reset line from the remote processor device.

7. The system of claim 1, wherein the switch comprises a PCIe switch and the adapter card comprises a PCIe reference clock.

8. A replacement adapter card comprising:
   a computer-on-module (COM) express form factor configured to couple the replacement adapter card to a circuit board of a computing device, instead of a (COM) express module adapter card, the circuit board comprising a first Peripheral Component Interconnect Express (PCIe) backplane comprising a plurality of PCIe lanes, wherein the computing device is configured to receive a core central processing unit (CPU) of the computing device from the COM express module adapter card that is coupled to the first PCIe backplane;
   a switch that aggregates the plurality of PCIe lanes;
   a transceiver that transmits and receives data from the PCIe lanes; and
   a communication link coupled to the transceiver and to a remote processor device, the remote processor device providing the core CPU to the computing device;
   wherein the remote processor device comprises a second adapter card that plugs into a second backplane on an external processor device, wherein the external processor device comprises an external CPU that functions as the core CPU of the computing device;
   wherein the second backplane is physically separated from the first PCIe backplane and the first PCIe backplane receives the core CPU of the computing device from the remote processor device.

9. The adapter card of claim 8, wherein the communication link is an optical fiber.

10. The adapter card of claim 8, wherein the communication link is a copper cable.

11. The adapter card of claim 8, wherein the remote processor device comprises a server having a plurality of processors.

12. The adapter card of claim 8, wherein the replacement adapter card further provides to the computing device: memory functionality, input/output, a Universal Serial Bus (USB), audio and graphics.

13. The adapter card of claim 8, wherein the communication link comprises a plurality of optical fibers, and one of the optical fibers comprises a reset line from the remote processor device.

14. The adapter card of claim 8, wherein the switch comprises a PCIe switch further comprises a PCIe reference clock coupled to the PCIe switch.

15. A method of providing a core central processing unit (CPU) to a circuit board of a computing device comprising a first Peripheral Component Interconnect Express (PCIe) backplane configured to receive the core CPU of the computing device from a computer-on-module (COM) express module adapter card that is coupled to the backplane, the method comprising:

coupling a replacement adapter card having a (COM) express form factor and coupled to the first PCIe backplane instead of the (COM) express module adapter card, the replacement adapter card comprising a switch that aggregates one or more PCIe lanes and a transceiver; and transmitting and receiving on a communication link data between the PCIe lanes and a remote processor device, the remote processor device providing the core CPU to the computing device;

wherein the remote processor device comprises a second adapter card that plugs into a second backplane on an external processor device, wherein the external processor device comprises an external CPU that functions as the core CPU of the computing device;

wherein the second backplane is physically separated from the first PCIe backplane and the first PCIe backplane receives the core CPU of the computing device from the remote processor device.

16. The method of claim 15, wherein the communication link is an optical fiber.

17. The method of claim 15, wherein the communication link is a copper cable.

18. The method of claim 15, wherein the replacement adapter card further provides to the computing device: memory functionality, input/output, a Universal Serial Bus (USB), audio and graphics.

19. The method of claim 15, wherein the communication link comprises a plurality of optical fibers, and one of the optical fibers comprises a reset line from the remote processor device.

20. The method of claim 15, wherein the switch comprises a PCIe switch and the adapter card comprises a PCIe reference clock.

\* \* \* \* \*